United States Patent [19]

Lent

[11] Patent Number: 4,492,208

[45] Date of Patent: Jan. 8, 1985

[54] LIQUID PROPANE GAS FUEL SYSTEM

[75] Inventor: Mark S. Lent, Golden Valley, Minn.

[73] Assignee: McGraw-Edison Company, Rolling Meadows, Ill.

[21] Appl. No.: 510,112

[22] Filed: Jul. 1, 1983

[51] Int. Cl.³ .............................................. F02B 43/00
[52] U.S. Cl. ................... 123/527; 123/557; 123/195 A; 261/39 D
[58] Field of Search ............... 123/527, 557, 553, 1 A, 123/195 A; 261/39 D

[56] References Cited

U.S. PATENT DOCUMENTS

| 2,381,304 | 8/1945 | Merrill | 123/527 |
| 2,752,758 | 7/1956 | Tann | 123/527 |
| 2,755,633 | 7/1956 | McClain | 123/557 |
| 3,110,296 | 11/1963 | Lundi | 123/557 |
| 3,114,357 | 12/1963 | Mortin et al. | 123/527 |
| 3,524,734 | 8/1970 | Kamiryo et al. | 123/557 |
| 3,693,947 | 9/1972 | Masaki et al. | 261/39 D |

*Primary Examiner*—Ethel R. Cross
*Attorney, Agent, or Firm*—Jon Carl Gealow; James A. Gabala; Ronald Coolley

[57] ABSTRACT

A liquid propane gas fuel system includes a propane fuel tank. A two stage pressure regulator defined by a housing with a fuel inlet and a fuel outlet is also included. A first fuel conduit extends from an outlet in the fuel tank to the fuel inlet in the pressure regulator. The system supplies fuel to an engine that includes an exhaust gas manifold. A thermoconductive mounting bracket is secured to the housing of the pressure regulator and manifold to transmit heat from the manifold to the regulator in proportion to the load imposed on the engine. A chokeless carburetor is also included in the system and is in fluid communication through a second fuel conduit with the outlet of the pressure regulator. In an alternative embodiment, a heat exchange ris included in the first fuel conduit. In a second alternative embodiment, an electric heating element is positioned within the housing of the pressure regulator.

11 Claims, 8 Drawing Figures

LIQUID PROPANE GAS FUEL SYSTEM

FIELD OF THE INVENTION

The present invention relates to a new and improved system for vaporizing liquid propane gas for fuel in water or air cooled engines and more particularly, to a new and improved device for vaporizing liquid propane gas in proportion to the load on an engine.

DESCRIPTION OF THE BACKGROUND ART

Liquid propane gas is a desirable fuel for engines due to its availability and fewer pollutants upon burning. One difficulty in using liquid propane gas as fuel is it must be vaporized prior to introduction to the carburetor of an engine. Another difficulty is vaporization of liquid propane gas for low temperature starts.

It has been known that hydrocarbon fuels (for example propane or butane fuel) with boiling points below operating ambient temperature fused for spark ignition internal combustion engines must be carburated in a gaseous state. These fuels are most economically stored in liquid state and require vaporization by addition of heat. For reliable and efficient engine operation, the fuel/air mixture must be maintained at prescribed ratios throughout the load, speed and ambient temperature ranges of the engine.

The design of ordinary carburetors, for fuels in gaseous state, assumes that the fuel is maintained at a constant density (i.e., temperature and pressure) to maintain the proper fuel/air ratio. If fuel density increases, the fuel/air ratio increases resulting in a richer fuel mixture. Conversely, if density decreases, the fuel/air ratio decreases resulting in a lean fuel mixture. To help maintain constant fuel density, a pressure regulator is often used. Constant fuel temperature is also required to maintain constant fuel density. Some liquid fuel vaporizer systems suffer performance losses because they either do not control fuel temperature (such as those systems disclosed in U.S. Pat. Nos. 3,184,295 and 2,752,758). Others use a temperature control system such as a thermostat to control fuel temperatures (such as those illustrated in U.S. Pat. Nos. 2,752,758; 4,341,194; 2,073,276 and 4,099,499).

Fuel consumption and the heat flux required for fuel vaporization vary greatly with engine load and speed. To maintain constant fuel temperature, the heat flux supplied by the vaporizer must vary to match the engine's specific requirements. During low ambient temperature starts, a spark ignition engine requires a higher fuel/air ratio (i.e. richer fuel mixture) than when the engine is running at operating temperature. This is typically accomplished with an electric solenoid overriding the demand stage of the pressure regulator.

In systems for water cooled engines only, initial vaporization is supplied by thermoenergy stored in the regulator/vaporizer and in the engine coolant circulated through the regulator/vaporizer once the engine has started. Since liquid propane vaporizes at minus 44° F. and the regulator/vaporizer and engine coolant are at ambient temperatures, less fuel is vaporized during start up. Consequently, in this system, only fuel sufficient to idle the engine is available after start up. After approximately fifteen minutes, the engine and coolant are sufficiently hot such that a full load may be imposed on the engine. With such systems including the engine is difficult and the engine runs poorly for several minutes after starting. Examples of systems using engine coolant to vaporize fuel are disclosed in U.S. Pat. Nos. 4,341,194; 2,752,758; 2,896,658; 3,184,295; 2,788,779; 2,821,843; 3,114,357 and 3,565,201.

One liquid fuel system passes exhaust gas through passages provided in a vaporizer designed for use with water coolant as a heat source. This raises the temperature of the vaporizer more rapidly and avoids long periods of engine idling before applying a full load to the engine. This system has not been approved by the necessary certifying organizations since the materials used in the vaporizer can fail allowing exhaust and fuel systems to be connected resulting in a dangerous situation.

Other liquid fuel systems are specifically designed to use engine exhaust as a vaporizing heat source. Those systems invariably incorporate a temperature control system to prevent under-vaporization or overheating of the fuel. A temperature control system is required because these systems place the vaporizer significantly ahead of the pressure regulator resulting in a large heat flux time constant during load and speed transients. As a result, these systems produce wide swings in heat flux to compensate for lack of responsiveness to heat flux changes. This results in oversizing of the heat exchanger for transient conditions. Such systems are disclosed in U.S. Pat. No. 4,994,499.

Other systems employ air heated vaporizers for air cooled engines. The cooling air, however, does not warm above ambient temperature for approximately five minutes after start up. Since the amount of heat stored in the regulator drops rapidly as low temperature liquid propane gas flows through the regulator, cold starting capability of this system is severely limited.

To avoid the problems of the above mentioned systems there are systems that employ a heat exchanger mounted on the exhaust gas manifold. All initial heat for vaporization during engine start up is supplied by thermal energy of the regulator. Additional heat is supplied once the temperature of the heat exchanger is elevated by exhaust gas in the manifold. However, these systems require warm up periods before full load can be applied to the engine. Systems employing a heat exchanger heated by exhaust gas are illustrated in U.S. Pat. Nos. 2,409,611; 3,524,734; 3,978,823 and 2,386,594.

U.S. Pat. No. 2,386,594 discloses a fuel vaporizer that is mounted directly on the exhaust manifold of the engine. A system of this type suffers from the disadvantage that there is no control of the temperature of the vaporizer and under heavy loads the exhaust manifold temperature will be extremely high. The vaporizer will be substantially the same temperature as the manifold and this high temperature can result in over-vaporization of the liquid propane gas causing the engine to shutdown.

A variation of this type of device is illustrated in U.S. Pat. No. 2,711,718 in which a vaporizer is disclosed as being mounted on and within the exhaust manifold. This system not only may result in over-vaporization but also is subject to the dangerous condition of failure causing fuel to pass into the exhaust system creating the possibility of an explosion.

A further example of a vaporizer system is one that coils a fuel line around an exhaust pipe. The fuel line is wound so as to touch the exhaust pipe at one or two points. After operation, the fuel line no longer completely touches the exhaust pipe resulting in less vaporization of the liquid propane gas. An example of a device of this type is illustrated in U.S. Pat. No. 1,384,512.

In U.S. Pat. No. 2,073,276, placing a heating coil within a branch of the exhaust pipe or manifold is disclosed. Fuel passing through this coil is vaporized. If a failure occurs in this system, fuel may pass into the exhaust resulting in an explosion. A similar procedure is disclosed in U.S. Pat. No. 2,244,623 in which the fuel line is positioned within the water jacket of the engine.

Another approach to vaporizing liquid fuel is to heat the pressure regulators electrically such as disclosed in U.S. Pat. Nos. 4,092,963 and 2,030,745. The use of an electric heater to vaporize fuel in a gas generator is illustrated in U.S. Pat. No. 1,950,860. An electric vaporizer in proximity to an exhaust manifold is disclosed in U.S. Pat. No. 2,342,132. This system uses both a heated filament and heat from an exhaust manifold to gasify raw liquid fuel. U.S. Pat. Nos. 4,047,512 and 4,942,275 disclose metering systems in which fuel may be electrically heated for vaporization.

Another difficulty in prior art systems is matching the rate of vaporization of fuel to the engine load. As more load is applied to the engine, more fuel is required and a greater rate of vaporization is necessary. One way to increase the rate of vaporization is to increase the temperature of the vaporizer. Raising the temperature has been difficult to accomplish since temperature must rise and fall in proportion to the increase and decrease of the load on the engine. Complicated and expensive systems have been used with less than complete success.

SUMMARY OF THE INVENTION

An object of the present invention is to provide a new and improved fuel supply system for an engine.

Another object of the present invention is to provide a new and improved liquid propane gas fuel system for an engine.

A further object of the present invention is to provide a new and improved pressure regulator in a liquid propane gas system and mounting structure for heating the regulator in proportion to engine load.

A still further object of the present invention is to provide a new and improved electrical heating device for vaporizing liquid propane gas in a fuel system for an engine.

Another object of the present invention is to provide a new and improved liquid propane gas fuel system including a chokeless carburetor.

Briefly, the present invention is directed to a new and improved liquid propane gas supply system for an engine. The system includes a fuel tank connected by a first fuel conduit to a pressure regulator. The pressure regulator is mounted by a bracket to an exhaust manifold of the engine. The bracket is fabricated of a thermoconductive material that conducts heat from the exhaust manifold to the housing in proportion to engine load. A second fuel conduit connects the pressure regulator with a chokeless carburetor.

In an alternative embodiment, an electrically heated vaporizer is positioned in the first fluid line between the tank and the pressure regulator to vaporize liquid propane gas prior to introduction to the regulator where further vaporization may occur.

In another alternative embodiment of the present invention, an electric heating element is positioned within the housing of the regulator to assist in vaporizing liquid propane gas during start up in particularly cold ambient conditions.

BRIEF DESCRIPTION OF THE DRAWINGS

The above and other objects and advantages and novel features of the present invention will become apparent from the following detailed description of preferred embodiments of the invention illustrated in the accompanying drawings wherein.

DETAILED DESCRIPTION OF THE PREFERRED EMBODIMENTS

Figure 1:
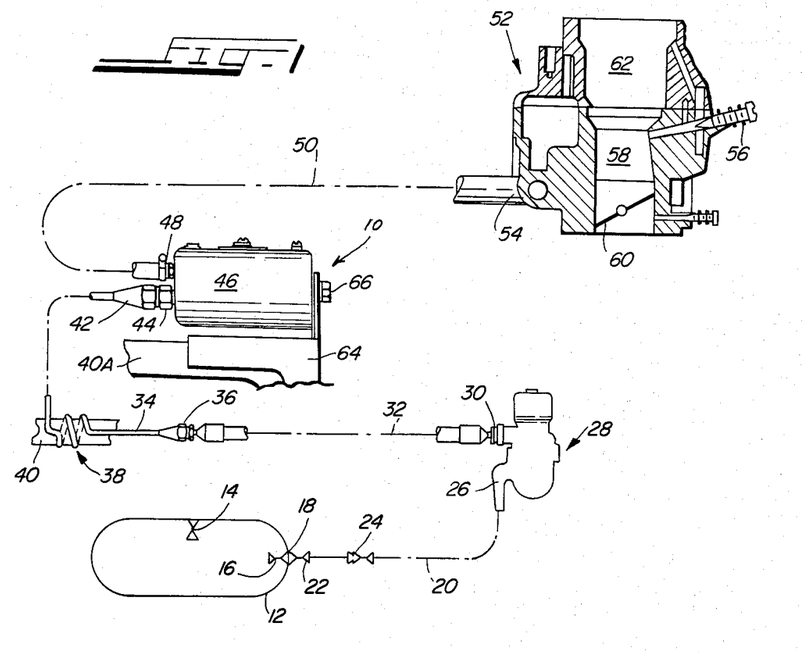
FIG. 1 is a schematic illustration of a liquid propane fuel system including a regulator mounted on a heat conducting bracket.

Referring initially to FIGS. 1–4 and in particular FIG. 1, there is illustrated a liquid propane fuel supply system generally designated by the reference numeral 10. The system 10 supplies liquid propane gas from a tank 12 to an internal combustion engine (not shown). System 10 vaporizes liquid propane gas allowing it to be carburated in a gaseous or vaporized state.

Fuel tank 12 includes a pressure relief valve 14 and a flow valve 16 mounted in an outlet 18 of tank 12 to communicate the interior of tank 12 with a first fuel line 20. A manual shut off valve 22 is provided to allow shut off of fuel flow. To protect fuel line 20, a hydrostatic relief valve 24 is also provided.

Fuel line 20 is coupled by a connector 26 to a fuel filter generally designated by the reference numeral 28. Fuel filter 28 protects engine and fuel system components from contaminants and may include a magnet to collect magnetic particles. Fuel filter 28 includes an outlet connector 30 to which a second fuel line 32 is connected.

Second fuel line 32 is connected to a third fuel line 34 through a connector 36. Fuel line 34 includes a helical wrap heat exchanger generally designated by the reference numeral 38 that is wrapped around an exhaust manifold 40 of the internal combustion engine. Heat exchanger 38 contacts exhaust manifold 40 at one or more points. After the engine has run for a short period, the temperature of manifold 40 will increase thereby assisting in vaporization of fuel flowing through fuel line 34.

Fuel line 34 is secured by a connector 42 to an inlet 44 of a two-stage pressure regulator 46. Pressure regulator 46 maintains constant fuel pressure within system 10 thereby facilitating the maintenance of a constant fuel density.

Propane fuel stored in tank 12 is in liquid state. Liquid propane vaporizes at minus 44° F. Since fuel lines 20, 32 and 34, and pressure regulator 46 are at ambient temperature typically higher than minus 44° F. These components provide the vaporization heat necessary to start and run the engine until engine heat is available.

As will be explained later in greater detail, not all of the fuel is vaporized in system 10 during a cold start up. There is limited liquid carryover in fuel leaving outlet 48 of regulator 46 and entering fourth fuel line 50. Fuel is introduced to the carburetor generally designated by the reference numeral 52 from line 50 through inlet 54. Fuel with liquid carryover is introduced through needle valve 56 into throat or venturi 58 of carburetor 52. Throttle or butterfly valve 60 controls the air and fuel mixture through the carburetor 52 in accordance with demand.

It should be observed that the upper mixing chamber 62 of carburetor 52 need not be provided with a choke. This is due to inherent choking characteristics of system 10 during initial starting.

Regulator 46 alone can only vaporize fuel between thirty seconds and two minutes before its temperature is decreased by the flowing fuel to a level too cold to vaporize the fuel. The temperature of regulator 46 will drop to the temperature of the lowest boiling point of the hydrocarbon in the fuel. At this temperature, the higher boiling point hydrocarbons will collect as liquid in regulator 46. If too much liquid collects in regulator 46, the engine will stop due to a too rich fuel mixture. To avoid this problem, the temperature of regulator 46 must be maintained or elevated after starting. The component of the engine that is the fastest to rise above ambient temperature after engine starting is the exhaust gas manifold. The optimum solution to the problem of elevating the temperature of regulator 46 as quickly as possible is to combine the regulator 46 with the exhaust manifold in a heat transfer relationship. This is accomplished through a thermoconductive bracket 64.

Figure 2:
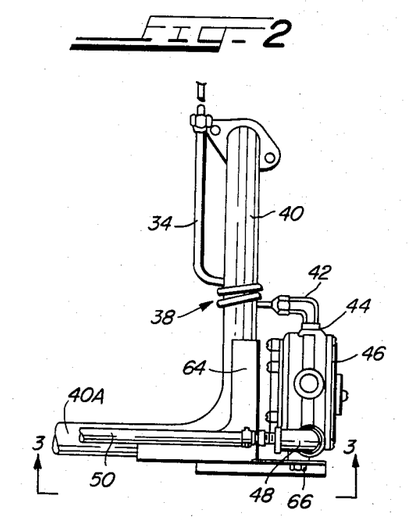
FIG. 2 is a view of the regulator and bracket of FIG. 1 secured to an exhaust manifold.
Figure 3:
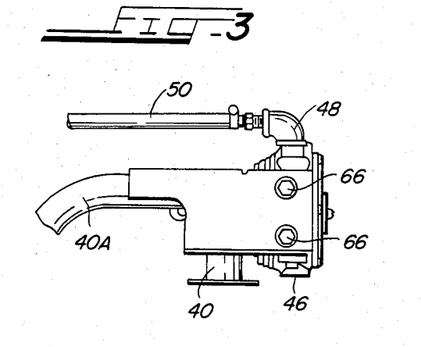
FIG. 3 is a view taken along line 3—3 of FIG. 2.

Thermoconductive bracket 64 is secured to the regulator 46 by threaded fasteners 66 and is mounted on a branch 40A of the exhaust manifold 40. It is preferrable that bracket 64 contact as much of the exhaust manifold 40 and 40A as possible thereby increasing the rate of heat transfer. By mounting the regulator 46 by bracket 64 to the exhaust manifold 40 and 40A inherent temperature regulation throughout the speed and load range of the engine is provided. This eliminates the necessity for a temperature control system. Inherent temperature regulation results from the observation that the heat available in the engine exhaust gasses passing through manifold 40 and 40A and the heat required for fuel vaporization correspond to each other under both steady and transient conditions and are a direct function of engine power level and speed. However, to utilize this relationship under steady and transient conditions of engine power, the heat flux time constant of the vaporizer system must be very short so that, when the heat in exhaust manifold 40 and 40A changes due to a load or speed change, the heat available at the point of vaporization in the pressure regulator 46 quickly changes thereby preventing under-vaporization or over-heating of the fuel. The heat flux time constant of the system 10 is maintained at a very short period by adjusting/optimizing the mass, thermal conductivity, and cross-section area of the thermoconductive bracket 64. By locating the heat exchanger 38 immediately ahead of the regulator 46 more heat flux than a non-optimized mounting bracket can be provided. By placing the heat exchanger 38 immediately ahead of the regulator 46 and having the heat exchanger supply only a portion of the heat required, the vaporizer system's time constant is kept acceptably low. Moreover, this arrangement supplies an enriched fuel mixture for a longer time after a cold start than a system not having a heat exchanger. This is because of the longer time constant of the heat exchanger as compared to the exhaust manifold mounted regulator alone.

Figure 4:
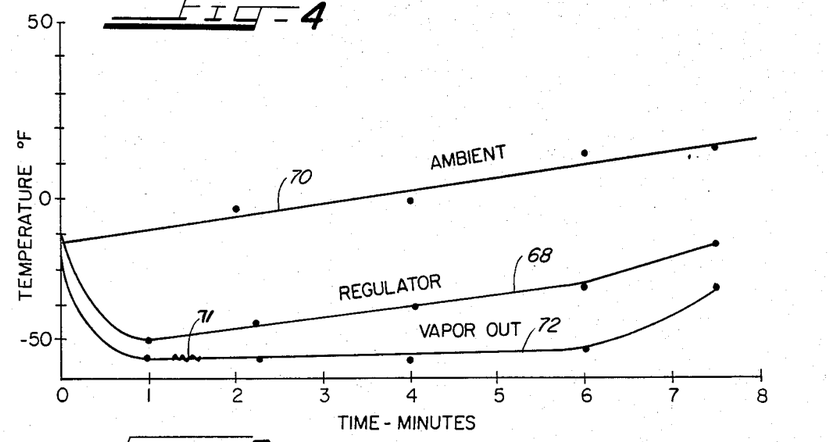
FIG. 4 is a graph displaying the temperature and time relationship for a cold start using the system illustrated in FIGS. 1–3.

Turning to FIG. 4 there is graphically illustrated a typical cold start with system 10 illustrated in FIGS. 1-3. Regulator temperature, indicated by line 68, rapidly decreases from ambient temperature indicated by line 70 for a period of one minute after starting. Vapor out or fuel temperature indicated by the line 72 passing out of regulator 46 also decreases rapidly for the same period. Thereafter, temperature of regulator 46 is gradually elevated as temperature of exhaust gasses passing through exhaust manifold 40, 40A increases. As temperature of regulator 46 increases, vapor out or vaporized fuel temperature also increases as illustrated in FIG. 4. Full load engine operation after a cold start is available immediately with system 10 and a long warm up time as required in the prior art is not necessary.

The fuel mixture enrichment required during a cold start and engine warm up period is believed to be inherently provided in two ways. At very low ambients the fuel mixture enrichment is provided by a very limited liquid fuel carry-over (see line 71 on FIG. 4). At more moderate low ambients this enrichment is provided by the regulator supplying fuel at a significantly lower temperature and higher density fuel than at the engine's operating temperature. This result is achieved by the regulator bracket 64 on the exhaust manifold. The manifold location has ideal characteristics as a vaporizer heat source since its temperature starts to rise rapidly and immediately after a cold start so it can take over as the vaporizer heat source before the stored thermal energy is totally used. The bracket 64 should be sized such that temperature rise of the exhaust manifold and the regulator to operating temperature coincide with the warmup time of the engine during which fuel mixture enrichment is required. Preferably this relationship maintained (i.e., by optimization) for all load and speed operating points immediately after start-up; the result is superior load acceptance after start-up compared to other systems. If so designed, no separate fuel enrichment system is needed.

Figure 5:
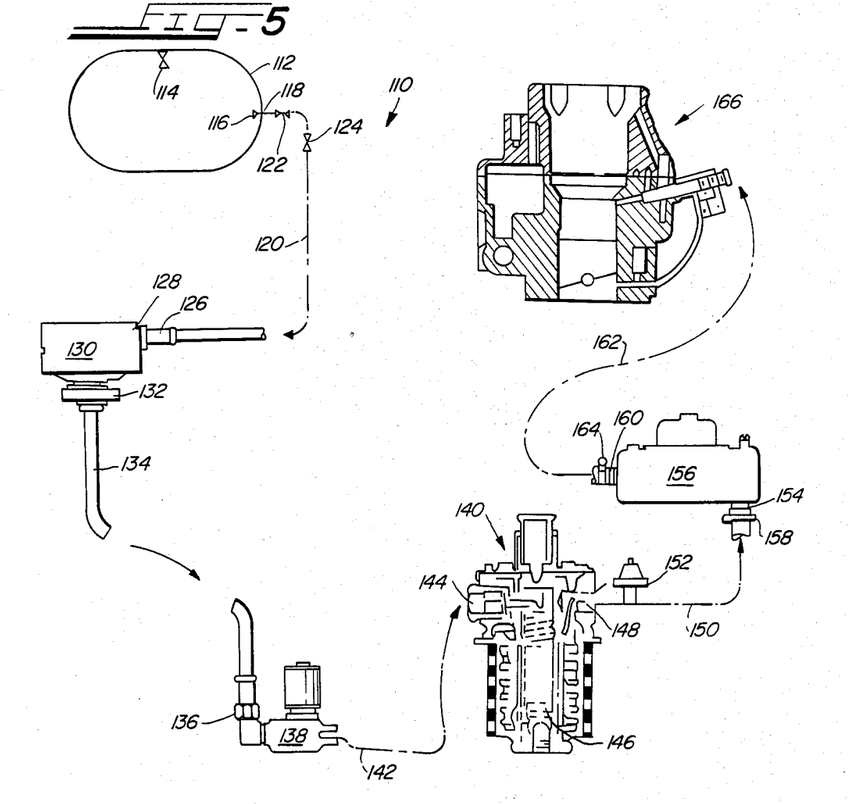
FIG. 5 is a schematic illustration of a liquid propane fuel system including an electrically heated vaporizer.

In particularly low ambient temperatures it is desirable to provide instantaneous heat of higher than ambient temperature to vaporize fuel flowing through the fuel supply system. A system 110 capable of providing instantaneous heat and employing a separate electrically powered vaporizer 140 is illustrated in FIG. 5. System 110 includes a tank 112 substantially similar to tank 12 in system 10. Tank 112 includes a safety relief valve 114 and an excess flow valve 116 at the tank outlet 118. Outlet 118 is connected to a first fuel line 120 in which a manual shut off valve 122 and a hydrostatic pressure relief valve 124 are provided. First fuel line 120 is connected by connector 126 to inlet 128 of filter 130. The filter 130 performs substantially the same function as filter 28 in system 10. Outlet 132 of filter 130 is coupled to a second fuel line 134. Second fuel line 134 is coupled by coupling 136 to a fuel lock assembly 138. Fuel lock assembly 138 allows fluid flow during engine cranking and while the engine is running and is closed at all other times. Fuel lock assembly 138 is coupled by a third fuel line 142 to an electrically heated vaporizer generally designated by the reference numeral 140.

Vaporizer 140 includes an inlet 144 connected to third fluid line 142. Liquid propane gas entering inlet 144 flows through an internal conduit 146 that is wrapped by an electric heating element or similar device to elevate the temperature of the fuel. Vaporized fuel flows through outlet 148 of vaporizer 140 and into a fourth fuel line 150. A safety feature in fuel line 150 is provided by a pressure switch 152 which disconnects the electric element if pressure in fuel line 150 exceeds a set value.

Since vaporizer 140 is electrically heated, the temperature of vaporizer 140 may be elevated prior to starting the engine ensuring the desired level of vaporization. Vaporizer 140 is capable of supplying the total engine fuel requirements at all ambient temperatures and operating conditions.

Fuel line 150 is connected to an inlet 154 of a two stage pressure regulator 156 by a coupling 158. Pressure regulator 156 maintains a constant fuel pressure similar to regulator 46 in system 10. Outlet 160 of pressure regulator 156 is coupled to a fifth fuel line 162 by a coupling 164. Fifth fuel line 162 communicates vaporized fuel to a chokeless carburetor 166 similar to carburetor 52 in system 10.

Figure 6:
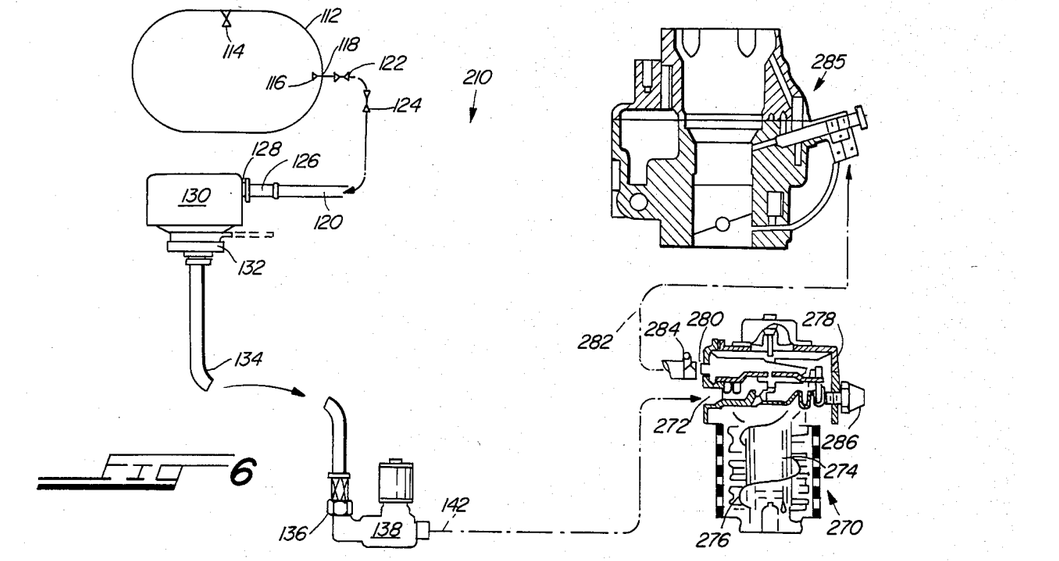
FIG. 6 is a schematic illustration of a liquid propane fuel system including an electrically heated regulator/vaporizer.

An alternative to this system 110 is illustrated in FIG. 6 and is designated by numeral 210. System 210 includes many of the components illustrated in system 110 and are referenced by the same numerals provided in FIG. 5. System 210 differs from the system 110 previously discussed (see FIG. 5) in that a two stage pressure regulator and electrically heated vaporizer are combined in one unit, generally designated by the reference numeral 270. This unit 270 includes an inlet 272 connected to fuel line 142. Fuel flows from the inlet 272 through a conduit 274 around which is wrapped an electric heating element 276. Vaporized fuel flows from conduit 274 through the pressure regulator portion 278 of the unit 270, through outlet 280 to a fuel line 282 that is connected to outlet 280 by a connector 284. A pressure switch 286 is provided and functions in the same manner as switch 152 in the previous system 110. Vaporized fuel flows through line 282 to a chokeless carburetor 285. The carburetor 285 is substantially identical to carburetor 166 and 52 in the two systems 110 and 10 previously described. This unit 270 is preferably capable of supplying total engine fuel requirements at all ambient and operating conditions and is desirable for cold starting at very low temperatures.

Figure 7:
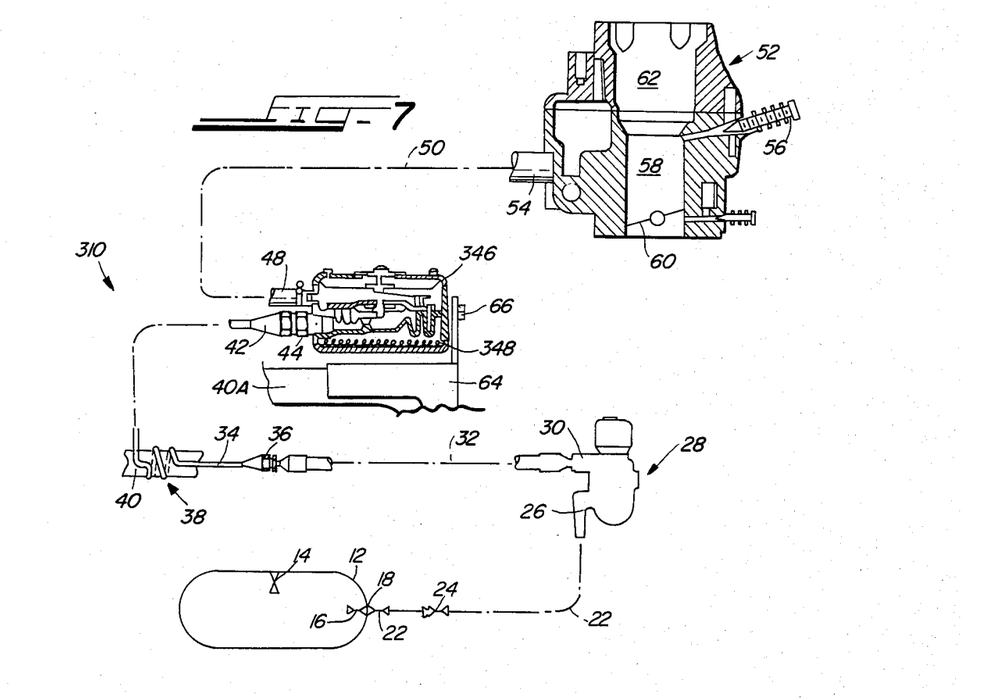
FIG. 7 is a schematic illustration of a liquid propane gas fuel system including an electric preheater mounted in the body of a pressure regulator.

In extremely cold ambient temperature situations a system designated by reference numeral 310 and illustrated in FIG. 7 is desirable. This system 310 includes several of the same components provided in system 10. The components are designated by the same reference numerals as appear in FIG. 1 and are not further described.

System 310 differs from system 10 in that pressure regulator 346 in system 310 includes an electric preheating element 348 in the housing to preheat the pressure regulator 346. Pressure regulator 346 is mounted on a bracket 64 and after the engine has started, electric heating element 348 may be deenergized and the temperature of the pressure regulator 346 will remain at the desired level by conduction of heat from the manifold 40A through bracket 64.

Figure 8:
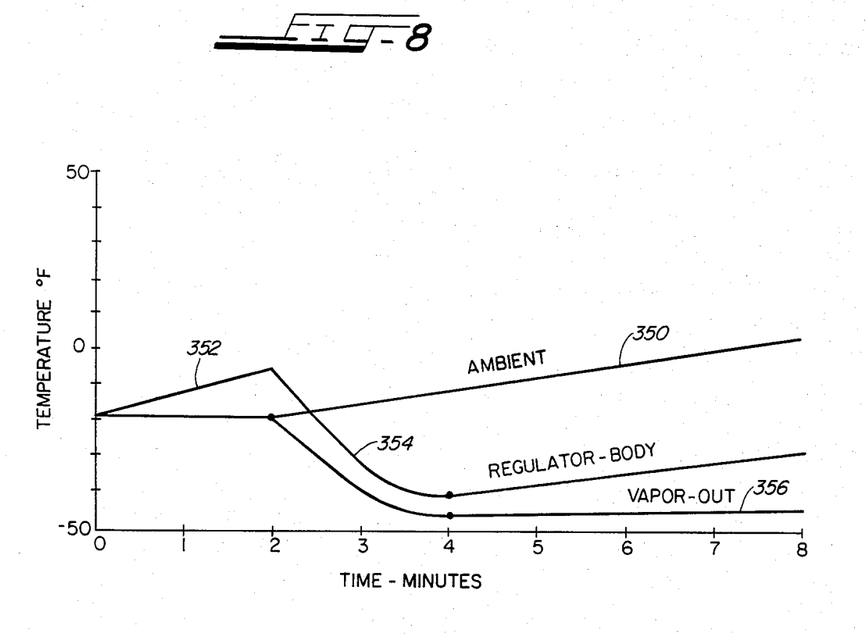
FIG. 8 is a graph illustrating temperature and time relationship of a cold start in a liquid propane gas fuel system including the electric preheater illustrated in FIG. 7.

FIG. 8 is a graphic illustration of a successful cold start in extremely cold ambient conditions wherein the preheating element 348 is employed. As illustrated in FIG. 8, ambient temperature is indicated by the line 350. For an initial period of approximately two minutes, regulator 346 is preheated by electric heating element 348. This period is indicated by the line 352. After the engine has been running for a short period, electrical heating element 348 is deenergized and the temperature of the regulator body follows the path of line 354. The temperature of the vapor out of the regulator or fuel temperature follows line 356. A cold start of an engine at extremely cold ambient temperatures is possible due to the electric preheater or heating element 348. Element 348 warms regulator 346 above ambient temperature providing sufficient thermal energy for vaporization until exhaust manifold 40A reaches the desired temperature level and can sustain engine operation.

What is claimed and sought to be secured by United States Letters Patent is:

1. Apparatus for supplying fuel to a combustion engine having an exhaust manifold, a carburetor, and a supply of liquefied gas fuel, comprising:
   (a) a pressure regulator having a housing defining an internal chamber, a fuel inlet in said housing in fluid communication with said chamber, means for coupling a fuel supply line to said fuel inlet, a fuel outlet in said housing in fluid communication with said chamber, and means for coupling said fuel outlet to the carburetor; and
   (b) bracket means for transferring heat to said pressure regulator in proportion to the engine load and characterized by a heat flux time constant such that the rate of change of temperature of said pressure regulator is proportional to the rate at which said engine increases in temperature during the warm-up time of said engine.

2. The system set forth in claim 1, wherein said bracket means comprises:
   a thermoconductive bracket mounted on the exhaust manifold of said engine, and
   means for securing said thermoconductive bracket to said regulator housing to allow conduction of heat from said manifold through said thermoconductive bracket to said regulator housing.

3. The system set forth in claim 1, further including: heat exchanger means, adjacent said pressure regulator, for transfering heat from said exhaust manifold to said fuel supply line.

4. The system set forth in claim 1, further including an electrically controlled valve in series with a fuel tank and said fuel supply line.

5. The system set forth in claim 1, wherein said fuel supply line is in heat conducting contact with said exhaust manifold such that the heat flux time constant of the fuel system is greater than that of said bracket means alone.

6. The system set forth in claim 4, further comprising a fuel filter in said fuel supply line.

7. A fuel supply system for an engine including an exhaust gas manifold, comprising:
   a fuel tank for containing a liquified gas;
   a pressure regulator including a housing, a fuel inlet in said housing, a fuel outlet in said housing;
   inlet means for communicating said tank and said fuel inlet in said pressure regulator for fuel flow therebetween;
   heat transfer means for transferring heat to said fuel in proportion to the load on said engine when said engine has been raised to its operating steady state temperature;

said heat transfer means comprises a heat conductive bracket secured to the exhaust manifold of the engine and secured to said housing of said pressure regulator, said bracket being of a preselected mass and configuration to transfer sufficient heat to vaporize said liquid fuel in said pressure regulator at a rate equal to the rate of warm up of said engine from a cold start;

a chokeless carburetor; and outlet means for communicating said fuel outlet of said pressure regulator with said carburetor for fuel flow therebetween.

8. The fuel supply system claimed in claim 7, wherein said inlet means is in heat conducting relationship with said exhaust gas manifold.

9. A liquid propane gas supply system for an engine including an exhaust gas manifold, said system comprising:

a liquid propane gas tank;

a pressure regulator including a housing, a fuel inlet in said housing, a fuel outlet in said housing;

a first fuel line extending from said liquid propane gas tank to said fuel inlet in said pressure regulator housing;

a thermoconductive bracket secured to said housing of said pressure regulator and to the exhaust gas manifold of said engine, said bracket being fabricated of a material and of a configuration to conduct heat from said exhaust gas manifold of said engine to said housing of said pressure regulator in direct proportion to the load on said engine after said engine has reached its operating temperature;

a chokeless carburetor; and a second fuel line extending from said fuel outlet in said pressure regulator housing to said chokeless carburetor.

10. The liquid propane gas supply system set forth in claim 9, wherein said pressure regulator is a two-stage regulator.

11. The liquid propane gas supply system set forth in claim 9, wherein said first fuel line is in heat conducting contact with said exhaust gas manifold.

* * * * *

UNITED STATES PATENT AND TRADEMARK OFFICE
CERTIFICATE OF CORRECTION

PATENT NO. : 4,492,208
DATED : January 8, 1985
INVENTOR(S) : Mark S. Lent

It is certified that error appears in the above-identified patent and that said Letters Patent is hereby corrected as shown below:

In the Abstract, the fourth line from the bottom, after "exchange", delete "ris" and insert -- is --.

In column 2, line 27, delete "4,994,499", and insert -- 4,099,499 --.

In column 3, line 18, delete "4,942,275" and insert -- 4,092,275 --.

Signed and Sealed this

First Day of October 1985

[SEAL]

Attest:

Attesting Officer

DONALD J. QUIGG

Commissioner of Patents and Trademarks—Designate